Patented Nov. 17, 1925.

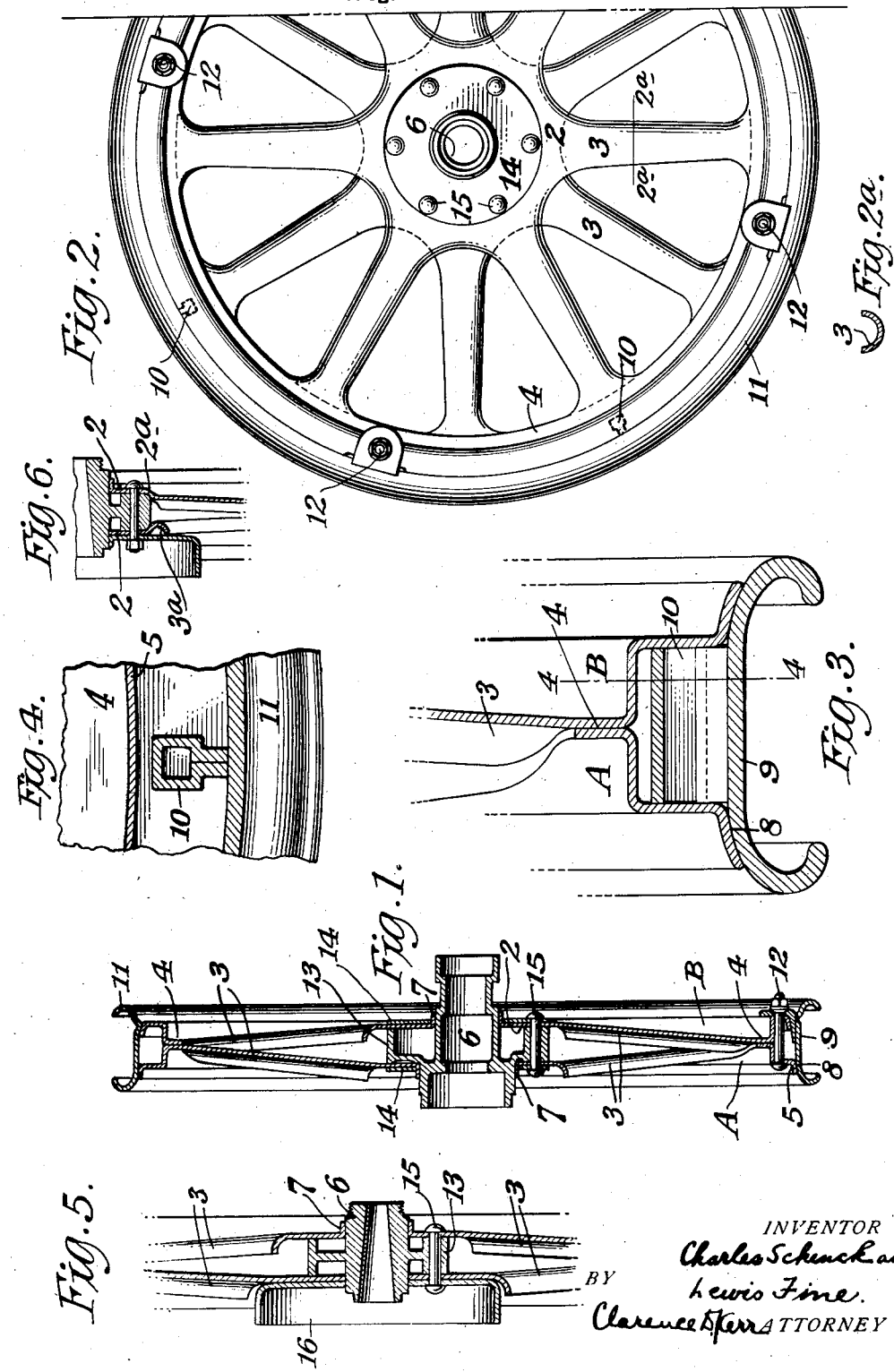

1,562,003

UNITED STATES PATENT OFFICE.

CHARLES SCHENCK AND LEWIS FINE, OF BETHLEHEM, PENNSYLVANIA, ASSIGNORS TO BETHLEHEM STEEL COMPANY, OF BETHLEHEM, PENNSYLVANIA, A CORPORATION OF PENNSYLVANIA.

METAL WHEEL.

Application filed January 3, 1922, Serial No. 526,570. Renewed April 1, 1925.

*To all whom it may concern:*

Be it known that we, CHARLES SCHENCK and LEWIS FINE, citizens of the United States, residing at Bethlehem, Northampton County, Pennsylvania, have jointly invented new and useful Improvements in Metal Wheels, of which the following is a specification, reference being had to the accompanying drawings, in which—

Fig. 1 is a section of a wheel embodying our invention; Fig. 2 is an elevation thereof; Fig. 2ª is a section on line 2ª—2ª of Fig. 2; Fig. 3 is a detail of a modified form of rim; Fig. 4 is a section on lines 4—4 of Fig. 3; and Figs. 5 and 6 are sections showing forms of the hub of a rear wheel.

Our invention relates to metal wheels and provides a wheel consisting of a minimum number of parts extremely light in weight but of very great strength. Our invention also consists in the various features which we shall hereinafter describe and claim.

Referring to the drawings, the wheel comprises two complementary parts A and B, each of which has a continuous hub portion 2, spokes 3 integral therewith and extending outwardly therefrom, a web portion 4 into which the outer ends of the spokes 3 merge, and a felloe portion 5. The webs 4 of the two parts A and B of the wheel are preferably secured together by spot welding, and the spokes 3 of one section are preferably arranged to be midway between the spokes of the other section and both sets of spokes 3 diverge from the central axial plane of the wheel from the webs 4 to the hub 6. The spokes 3 are grooved as is shown in Fig. 2ª, and the convex sides of both sets of spokes are faced outwardly to give the appearance of a wood artillery wheel. The hub portions 2 have outwardly extending flanges 7 to provide bearings on the hub barrel. The felloe portions 5 of each section are arranged with tapered seats 8 to receive a tire rim 9. The felloe section 5 is preferably reinforced by the pieces 10, which are preferably of T-shape and may be secured in the felloe by riveting or welding. These reinforcing pieces 10 not only stiffen the felloe 5 and prevent distortion, but also serve as a support for the rim 11. The pieces 10 may be located where required at the felloe bolt positions 12 or midway between the felloe bolts.

The hub 6 is preferably formed in a single piece and may be made of malleable iron, cast steel or a forging, and has an annular outwardly extending medial section 13 to which the hub portions 2 of the parts A and B are attached and which it maintains in the proper spaced relation.

In assembling the wheel, the parts A and B are slipped over the hub 6 from opposite sides and annular plates or washers 14 are then placed in position outside the hub portions 2, which serve to reinforce the wheel at the hub. The parts are then secured to the hub by bolts or rivets 15 which pass through the hub section 13, the hub portions 2 and the plates 14. The webs 4 of the parts A and B are next riveted or welded together and the T-shaped pieces 10 are then inserted and secured in the felloe 5. The rim may then be applied and secured by the bolts 12.

In Fig. 5 we have shown a section of a rear wheel embodying our invention in which the hub plates are omitted and a brake drum 16 is shown attached to the hub.

In Fig. 6 we have shown a partial section of a modified form of the hub portion of a rear wheel in which the outer parts of the hub portions 2 of A and B are offset inwardly at 2ª, which serves to stiffen the hub portions and also give it the effect of a flange on the outer side of the wheel. This offset also permits the grooving of the spokes from the edge of the hub portion 2 without interference from the brake drum, as is shown at 3ª.

Our invention provides a very light, strong and durable wheel in which the hub portions, spoke and web may be made of extremely light metal, but which because of their arrangement are properly constructed to take up the shocks and stresses of service without undue strain. The spokes are grooved or concave in form and are alternately splayed or diverged to take care of radial and side thrust loads.

The terms and expressions which we have employed are used as terms of description and not of limitation, and we have no intention, in the use of such terms and expressions, of excluding any mechanical equivalents of the features shown and described, or portions thereof, but recognize that various structural modifications are possible within the scope of the invention claimed.

What we claim is:—

1. A metal wheel comprising a hub member and two complementary parts, each part having an annulus engaging the periphery of the hub member, spokes extending outwardly from the annulus and merging at their outer ends into a continuous web, a portion of said web forming part of the felloe of the wheel, the webs of the complementary parts being in contact and supporting each other and being tied together by a permanent bond.

2. A metal wheel comprising a hub member and two complementary parts, each part having an uninterrupted portion engaging the periphery of the hub member, spokes extending outwardly from the said uninterrupted portion and merging at their outer ends into a continuous web, a portion of said web forming part of the felloe of the wheel, all of said spokes having concave faces facing toward the inner side of the wheel.

3. A metal wheel comprising a rim, a hub member and two complementary parts, each part having an uninterrupted portion engaging the periphery of the hub member, spokes extending outwardly from the said uninterrupted portion and merging at their outer ends into a continuous web, a portion of said web forming part of the felloe of the wheel, T-shaped reinforcing members secured in the web parts forming the felloe and supporting the rim, all of said spokes having concave faces facing toward the inner side of the wheel.

4. A metal wheel comprising a hub member and two complementary parts, each part having an uninterrupted web and felloe portion, each web portion and felloe being integrally joined by complete spoke members, the spoke members of each part consisting of one half of the number of spokes in the wheel, each part also having a portion of the web forming a part of the felloe of the wheel.

5. A metal wheel comprising a hub member, two complementary parts, each part having an annulus engaging the periphery of the hub member, the outer portion being offset to engage an extension of the hub member, spokes extending outwardly from the offset portion of the annulus and merging at their outer ends into a continuous web, a portion of said web forming part of the felloe of the wheel.

6. A metal wheel comprising a hub member, two complementary parts, each part having an annulus engaging the periphery of the hub member, the outer portion being offset to engage an extension of the hub member, a brake drum secured to the hub and abutting against one of said annuli, spokes having concave faces extending outwardly from the offset portion of the annulus without interference from the brake drum and merging at their outer ends into a continuous web, a portion of said web forming part of the felloe of the wheel.

7. In a wheel, the combination of a hub member, a pair of members each of which is integral and consists of inner and outer annuli joined by spokes, the inner annuli of the members being spaced apart and fixed to the hub, the spokes of the respective members converging toward each other so that the outer annuli contact, and the outer annuli being bent outwardly and then radially to constitute felloe forming portions, and means for holding the outer annuli in engagement.

8. In a wheel, the combination of a hub member having a radially extending spacing portion, a pair of members each of which is integral and consists of inner and outer annuli joined by spokes, the inner annuli engaging respectively opposite sides of the spacing portion, means for connecting the inner annuli to the spacing portion, the spokes of the respective members converging relatively to each other so that the outer annuli contact, and the outer annuli being bent outwardly and then radially to constitute felloe forming portions, and means for holding the outer annuli permanently in engagement.

CHARLES SCHENCK.
LEWIS FINE.